United States Patent Office 2,787,613
Patented Apr. 2, 1957

2,787,613

PROCESS OF CONTACTING SULFURIZED DIPENTENE WITH ACTIVATED ALUMINA

Ellis K. Fields, Chicago, Ill., assignor to Standard Oil Company, Chicago, Ill., a corporation of Indiana No Drawing. Application August 9, 1954,
Serial No. 448,772

3 Claims. (Cl. 260—139)

My invention relates to improvements in the manufacture of a sulfur containing bearing corrosion inhibitor of the terpene type, particularly sulfurized dipentene, for lubricating oil compositions. More particularly it relates to a process for controlling the corrosive sulfur content of a sulfurized dipentene type inhibitor produced from dipentene by sulfurization.

Sulfurized dipentene is one of several commercially important lubricating oil additives of the bearing corrosion inhibitor class. It is made from dipentene by sulfurization with excess sulfur. The use of a large excess of sulfur is important in order to obtain satisfactory yields of sulfurized product. Both naturally produced or stump dipentene, which contains about 50% limonene with the balance related hydrocarbons including other menthadienes, p-cymene, and p-menthene, and synthetically produced or chemical dipentene may be employed as starting material. When stump dipentene is used, the sulfur requirements may be upwards of 150% excess based on the molar quantity of sulfur necessary to react with the available unsaturation. When chemical dipentene, which is substantially pure limonene, is used as starting material, the sulfur requirements are reduced to as little as about 50% excess sulfur based on the molar quantity required to react with the double bonds in the limonene molecule.

Although a large excess of sulfur is required from the standpoint of satisfactory yields of sulfurised product, the use of excess sulfur is an undesirable cost burden on the manufacturing process and introduces purification and stabilization problems. The crude sulfurization product is active as an oxidation inhibitor, but it must be treated for removal of excess sulfur before it is suitable for use in an engine oil lubricating composition. The excess sulfur which appears to comprise both free sulfur and sulfur in loose chemical combination is corrosive to metal bearing surfaces, particularly silver and copper bearing surfaces. Removal of the excess sulfur presents a serious purification problem, and in commercial practice sulfur "deactivation" has required protracted washing with aqueous solutions of sodium sulfide, followed by a clean-up wash with water or a dilute chloride solution to remove traces of sodium sulfide. The deactivated product is stripped under reduced pressure in order to remove unreacted hydrocarbons and, in order to improve flash and odor, low molecular weight sulfur compounds.

My invention is based on the discovery that a dipentene sulfurization reaction mixture can be effectively deactivated by contacting with activated alumina. The dipentene starting material may be stump dipentene or chemical dipentene. It is reacted with about 17–60% sulfur by weight at a temperature in the range of 300°–400° F. The reaction period may approximate 15 minutes to about 4 hours. The sulfurization reaction mixture, advantageously but not necessarily, after completion of the reaction is contacted with activated alumina as by passage through a column of the alumina in granular or tableted form, or by mixing with granular alumina to form a slurry which is subsequently separated as by filtration or settling and decanting. The temperature during the deactivation step should be in the range of about 340°–450° F. Below 340° F., the reaction appears to be too slow to be practical. Above 450° F., unsatisfactory decomposition of the sulfurized dipentene product occurs. The uncombined and loosely combined sulfur is removed from the reaction mixture as hydrogen sulfide gas. The action of the alumina appears to be catalytic as it does not enter into reaction. A contact period of approximately 15 minutes to 4 hours is sufficient depending upon the extent of sulfur removal desired. Sufficient alumina is employed to establish effective contact, and the weight ratio of sulfurized dipentene to activated alumina may be, for example, about 100:1 to 2:1. Activated alumina or bauxite of commerce may be employed, for example, in a particle size range of from about 4 to 200 mesh. If the reaction mixture is to be contacted with the activated alumina in the form of a column or fixed bed, about 8–20 mesh weight size range is preferred. If the materials are to be contacted in a slurry system, about 20–200 mesh is preferred.

The effectiveness of sulfur deactivation may be tested by several convenient laboratory corrosion tests. One such test is a copper strip (ICCS) corrosion test which is conducted by suspending a small strip of polished copper in a 1% solution of the product to be tested in an inert hydrocarbon such as high boiling ligroin or refined oil. The solution is heated for 1 hour at 212° F. Free sulfur will cause the strip to turn black. A determination of relative corrosivity is obtained by comparison with a scale of standard strips numbered from 0 to 12. A perfect strip is rated 0, and a corrosion number of 2 to 6 on the scale is an indication of complete reaction of the sulfur charge. Sulfurized stump dipentene customarily contains 17–40% sulfur as produced and gives copper strips of 8–11 in the ICCS test. Sulfurized chemical dipentene usually gives lower copper strip ratings than the sulfurized stump dipentene products but also requires treatment to reduce the ICCS rating to 6 or less. In the illustrative examples, which are set out below, the effectiveness of the invention in reducing the ICCS numbers of sulfurized dipentene will be noted.

The corrosivity of lubricating oil blends containing sulfurized dipentene product also is evaluated by reference to a stirring sand corrosion test (SSCT). The SSCT test is conducted as follows: A copper-lead test specimen is lightly abraded with steel wool, washed with naphtha, dried and weighed to the nearest milligram. The cleaned copper-lead test specimen is suspended in a steel beaker, cleaned with a hot tri-sodium phosphate solution, rinsed with water and acetone and dried. 250 grams of the oil to be tested, together with 0.625 gram lead oxide and 50 grams of a 30–35 mesh sand are charged to the beaker. The beaker is then placed in a bath or heating block and heated to a temperature of 300° F. ($\pm 2°$ F.) while the contents are stirred by means of a stirrer rotating at 750 R. P. M. The contents of the beaker are maintained at this temperature for twenty-four hours, after which the copper-lead test specimen is removed, rinsed with naphtha, dried and weighed. The test specimen is then replaced in the beaker and an additional 0.375 gram of lead oxide added to the test oil. At the end of an additional twenty-four hours of test operation the test specimen is again removed, rinsed and dried as before, and weighed. The test specimen is again placed in the beaker together with an additional 0.250 gram of lead oxide and the test continued for another twenty-four hours (seventy-two hours total). At the conclusion of this time, the test specimen is removed from the beaker, rinsed in naphtha, dried and weighed. The loss in weight of the test specimen is recorded after each weighing. A weight loss of 200 mg. or less in 48 hours and 500 mg. or less in 72 hours is allowable.

*Example I*

A quantity of stump (450 g.) dipentene (consisting of 50% dl-limonene, 5% terpinene, 5% terpinolene, and 17% p-cymene) was reacted with 150 g. of sulfur at 350° F. for 1 hour. The product contained 24.9% sulfur and gave a copper strip of 9 in the ICCS test. 100 g. of this product was passed through a glass column 1" in diameter and 12" long containing 20 g. of 8–14 mesh Alcoa activated alumina at 360° F. over a 40 minute period. The column was cooled to 180° F. and rinsed with 50 cc. of benzene. The combined liquids were stripped using a pot temperature of 200° F. at 7–8 mm. The residue weighed 58 g. and analyzed 31.7% sulfur. It showed a viscosity at 210° F. of 60.59 SSU and had a specific gravity, $$\frac{60°}{60° \text{ F.}}$$

of 1.1515. It gave a copper strip of 4–5 in the ICCS test. In the SSCT at a concentration of 0.50% of the additive +1.65% of potassium hydroxide neutralized reaction product of phosphorous pentasulfide and a polybutene having a molecular weight of about 800 in a solvent refined SAE-30 base oil, it gave 82 mg. weight loss at 48 hours and 112 mg. at 72 hours.

*Example II*

A mixture of 250 g. of the original sulfurized dipentene of Example I and 12.5 g. of 20 mesh activated alumina was stirred at 380–385° F. for 1 hour. The mixture was filtered and stripped using a pot temperature of 200° F. and 7 mm., giving 144 g. product which analyzed 31.5% sulfur. The viscosity at 210° F. was 54.74 SSU and the specific gravity, $$\frac{60°}{60° \text{ F.}}$$

was 1.1438. The product gave a copper strip of 3–4 in the ICCS test.

*Example III*

To a stirred mixture of 330 g. sulfur and 134 g. of chemical dipentene (consisting of 95+% menthadienes) at 330° F. was added 536 g. of chemical dipentene over 1 hour. The mixture was kept at 330–335° F. for 15 minutes longer. It gave a copper strip of 9 and contained 32.9% sulfur.

One hundred grams of the sulfurized chemical dipentene was passed through 20 g. of activated alumina at 350–360° F. in 25 minutes. The product, 89 grams, analyzed 30.8% sulfur. It had a viscosity at 210° F. of 56.44 SSU and a specific gravity of 1.1380. It gave a copper strip of 2. At 0.50% concentration +1.65% of a potassium hydroxide neutralized reaction product of phosphorous pentasulfide and a polybutene having a molecular weight of about 800 in a solvent refined SAE-30 base oil it gave weight losses of 64 mg. at 48 hours and 125 mg. in 72 hours in the SSCT test.

The examples indicate the effectiveness of the invention in controlling and removing corrosive sulfur from sulfurized dipentene type bearing corrosion inhibitors. The invention has substantial advantages in operational simplicity compared to deactivation by washing with aqueous sodium sulfide material. It eliminates the handling and cost involved in successive sodium sulfide and water washing operations. Also the selectivity of the sulfur deactivation treatment with activated alumina has been found to reduce sulfur requirements in the sulfurization reaction for comparable yields, with concomitant cost savings. A further advantage of the activated alumina treatment is its special susceptibility to continuous processing. Thus, in a particularly advantageous application of the invention, dipentene is sulfurized by pumping molten sulfur and dipentene into a mixing tube or chamber which is maintained at a temperature of about 300°–400° F., e. g. 330°–340° F. The reaction mixture is passed through a column of activated alumina to complete the deactivation and the deactivated mixture is discharged into a still where the light ends are stripped, for example, at about 285° F. and under a reduced pressure of 10 millimeters of mercury.

I claim:

1. In the preparation of a sulfurized dipentene type bearing corrosion inhibitor by reacting dipentene with sulfur at a temperature in the range of approximately 300°–400° F., the improvement which comprises contacting the reaction mixture with activated alumina at a temperature in the range of about 340°–450° F. and stripping unreacted hydrocarbons from the reaction product.

2. In the preparation of a sulfurized dipentene type bearing corrosion inhibitor from dipentene by sulfurization, the method of controlling corrosive sulfur content which comprises contacting the sulfurization reaction mixture with activated alumina at a temperature in the range of 340°–450° F.

3. In the production of a sulfurized dipentene type bearing corrosion inhibitor by reaction of dipentene with sulfur, the process which comprises mixing molten sulfur and dipentene at a temperature in the range of about 300°–400° F., flowing the mixture through a body of activated alumina at a temperature in the range of about 340°–450° F. and stripping unreacted hydrocarbons from the reaction product.

References Cited in the file of this patent

UNITED STATES PATENTS

| | | |
|---|---|---|
| 2,348,080 | Lincoln et al. | May 2, 1944 |
| 2,367,348 | Harrington | Jan. 16, 1945 |
| 2,537,756 | Heinemann | Jan. 9, 1951 |
| 2,654,712 | Cyphers et al. | Oct. 6, 1953 |

FOREIGN PATENTS

| | | |
|---|---|---|
| 461,079 | Canada | Nov. 15, 1949 |